Patented Apr. 8, 1924.

1,490,073

UNITED STATES PATENT OFFICE.

NORMAN ARTHUR SHEPARD AND JUSTUS HARVEY DOERING, OF AKRON, OHIO, ASSIGNORS TO THE FIRESTONE TIRE AND RUBBER COMPANY, OF AKRON, OHIO, A CORPORATION OF OHIO.

ACCELERATOR FOR RUBBER-VULCANIZING, PROCESS OF MANUFACTURING SAME, AND VULCANIZING PROCESS.

No Drawing. Application filed April 25, 1921. Serial No. 464,377.

*To all whom it may concern:*

Be it known that we, NORMAN ARTHUR SHEPARD and JUSTUS HARVEY DOERING, citizens of the United States, residing at Akron, in the county of Summit and State of Ohio, have invented certain new and useful Improvements in Accelerators for Rubber-Vulcanizing, Process of Manufacturing Same, and Vulcanizing Process, of which the following is a specification.

It is a well known fact that the vulcanization of rubber or caoutchouc-like substances by means of sulphur is aided or accelerated by the addition of certain organic nitrogenous substances. Of these substances, aniline has been used on a large scale, aniline oil possessing a mild accelerating power, combined with a very desirable softening effect, which increases the workability of the uncured stock. But the use of aniline oil has been attended with disadvantages which tend to impair its usefulness to a considerable extent, one of the principal disadvantages being its extreme toxicity. In utilizing this substance as an accelerator it has been necessary to install expensive ventilating systems in both mill and calender rooms and even in spite of such precautions aniline has frequently had injurious effects on the operators.

For the purpose of developing an accelerator which could be used as a substitute for aniline, preserving its beneficial qualities and avoiding its toxic effects, various of its reaction products have been studied and developed as accelerators. Of these substances sym-diphenylthiourea, or thiocarbanilide, the reaction product of aniline with carbon disulfide has been suggested and used as an accelerator. This substance is distinctly less toxic than aniline, and at the same time is much more active as an accelerator of vulcanization. However, the desirable softening action attendant upon the use of aniline, together with its ease of incorporation, was lost by the treatment with carbon disulfide since thiocarbanilide is a solid with a high melting point (154° C.). As a further disadvantage in the use of thiocarbanilide, a rubber mixture containing it has an increased tendency to undergo preliminary vulcanization during the mixing, calendering or tubing, due to the low temperature at which vulcanization begins in the presence of this material. This effect is commonly referred to as "scorching" or "burning."

Owing to the highly valuable accelerating properties of the reaction product of aniline and carbon disulfide, many attempts have been made to eliminate its objectionable properties or modify its action so as to make its commercial use practical. Oils, resins and low grade rubbers have been introduced into the rubber mix, so that the temperature developed during the processing of "thio" stocks, as they are called, would be sufficiently low to avoid appreciable preliminary vulcanization; in some cases expensive refrigerating plants have even been installed to provide the mills with ample cooling water for this purpose.

We have found, however, that none of the precautions mentioned above, or any other measure beyond the ordinary precautions such as are usually taken in mixing rubber batches, are necessary in compounding stocks, if the reaction product of aniline and carbon disulfide is treated under certain conditions and by certain processes prior to its incorporation into the rubber mix. If the treatment of the reaction product is carried out along the lines indicated by us in this application, or along similar lines, a product is obtained which is highly valuable as an accelerator. There is no danger of "burning" the rubber mix under the ordinary and well known methods of milling stock, which means that the ordinary and well known temperatures and time elements must be considered, extraordinary precautions being unnecessary, as the temperature at which vulcanization progresses rapidly with the improved accelerator is higher than that ordinarily encountered in milling or calendering, which may reach 100° C. At the same time the mixing of the rubber is unattended by the evolution of disagreeable fumes or odors during the processing of the rubber mix or during vulcanization. The reaction product is non-toxic and the addition of the substance exerts a softening action on the rubber so that it mixes easily and uniformly owing to its low softening point, which is approximately 65° C., although the temperature may range both above and below this point.

We have discovered that if the crude reaction product of aniline and carbon disulfide is subjected to the process of our invention it is modified or converted into a substance which has the above beneficial properties which suit it admirably for use as an accelerator. While our invention has been perfected and practiced to such an extent that we know that the desirable qualities which we have enumerated are obtained, and that we are able to give a full and exact description of the steps to be performed in the treatment of the substance so as to enable one skilled in the art to practice the invention, we are unable to definitely state, because of the complexity of the reactions that take place during the process, the exact composition of the resulting product. It is essentially, however, a mixture comprising the following constituents: amorphous triphenylguanidine, carbodiphenylimide and µ-phenylamido-benzothiazole. Nor are we able to definitely affirm that certain of the steps are necessary or what may be considered equivalent steps to those set forth. The treatment we have outlined, however, produces an extremely practical and valuable substance for use as an accelerator and we are entitled to a full range of equivalents in both materials and steps of the process.

The process which we have devised and perfected comprises several steps which modify or convert the crude product of the reaction of aniline and carbon disulfide to a new and useful accelerator. This process consists in subjecting the crude reaction product of aniline and carbon disulfide to destructive and fractional distillation in a suitable apparatus until no further carbon disulfide distils off when the reacting mass has reached a temperature of about 220° C. Heating is then continued and the mass agitated by any suitable means, preferably by injecting air into it, in which case a greenish-brown product is obtained.

The product obtained in this way is then subjected to distillation in vacuo with rising temperature in order to remove aniline. When the mass temperature has reached 250° C., it is maintained at this point until no more aniline distils over. During the entire period of heating, hydrogen sulfide is given off.

The residue obtained by this process is the accelerator which is the subject of this invention. It is a greenish-brown, brittle, amorphous solid which retains its non-crystalline state indefinitely and has a softening point ranging from 65° to 75° C. A small and suitable proportion of this substance when mixed with rubber, sulphur and other ingredients of a rubber mix, has the valuable accelerating properties specified without the objectionable features of aniline, thiocarbanilide and other accelerators of a similar nature.

While the description of the invention has been given in detail, as the best method which we know for obtaining the results and practicing the invention, we are not understood to be limited to the exact process as set forth, but are entitled to such equivalents as are within the scope of our invention.

We claim:

1. The process of manufacturing an accelerator for use in vulcanizing rubber, comprising subjecting the reaction product of aniline and carbon disulfide to destructive and fractional distillation.

2. The process of manufacturing an accelerator for use in vulcanizing rubber, comprising subjecting the reaction product of aniline and carbon disulfide to destructive and fractional distillation until the mass becomes a greenish-brown color.

3. The process of manufacturing an accelerator for use in vulcanizing rubber, comprising subjecting the reaction product of aniline and carbon disulfide to destructive and fractional distillation and agitation.

4. The process of manufacturing an accelerator for use in vulcanizing rubber, comprising subjecting the reaction product of aniline and carbon disulfide to destructive and fractional distillation and agitation with air.

5. The process of manufacturing an accelerator for use in vulcanizing rubber, comprising subjecting the reaction product of aniline and carbon disulfide to temperatures up to 220° C. maintaining said temperature and agitating the mass with air until a greenish-brown product is obtained and then subjecting the mass to vacuum distillation and heat at 250° C.

6. The process of manufacturing an accelerator for use in vulcanizing rubber, comprising subjecting the reaction product of aniline and carbon disulfide to heat, agitation and distillation until carbon disulfide, hydrogen sulfide and aniline have liberated from the product.

7. An accelerator for use in vulcanizing rubber, obtained from the reaction product of carbon disulfide and aniline, by subjecting the product to heat and vacuum distillation.

8. An accelerator for use in vulcanizing rubber, which is a brittle amorphous solid of greenish-brown color, having a softening point ranging from 65° to 75° C., obtained from the reaction product of aniline and carbon disulfide.

9. An accelerator for use in vulcanizing rubber which is a derivative of the reaction product of aniline and carbon disulfide, having a softening point between 65° and 70° C.

10. An accelerator for use in vulcanizing rubber, which is a derivative of the reaction product of aniline and carbon disulfide having a softening point ranging from 65° to 75° C., and which is a greenish-brown brittle amorphous solid at ordinary temperature.

11. The process of treating the reaction product of aniline and carbon disulfide to adapt it for use as an accelerator, comprising subjecting it to heat and distillation until it is converted to a substance having a softening point of approximately 65° to 75° C.

12. The process of treating the reaction product of aniline and carbon disulfide to adapt it for use as an accelerator, comprising subjecting it to heat, agitation and distillation until it is converted to a substance having a softening point of approximately 65° to 75° C.

13. The process of treating the reaction product of aniline and carbon disulfide to adapt it for use as an accelerator, comprising subjecting it to heat and agitation with air and distillation in vacuo until it is converted to a substance having a softening point lying between 65° to 75° C.

14. The process of treating the reaction product of aniline and carbon disulfide to adapt it for use as an accelerator comprising heating it to 220° C., continuing said heating and agitating with air until a greenish-brown product is obtained, and subjecting said product to vacuum distillation up to 250° C., until aniline, carbon disulfide and hydrogen sulfide have been liberated from the product.

15. An accelerator for use in vulcanizing rubber, comprising the residue obtained by the distillation of the reaction product of aniline and carbon disulfide and having the property of accelerating the vulcanization of rubber, the critical temperature of vulcanization with said substance, or the temperature at which said substance exerts a marked effect on the speed of vulcanization, being above the ordinary temperature of milling and calendering.

16. An accelerator for use in vulcanizing rubber comprising the residue obtained by the distillation of the reaction product of aniline and carbon disulfide and having the property of producing no marked acceleration of the vulcanization of rubber below 100° C.

17. An accelerator for use in vulcanizing rubber comprising the residue obtained by the distillation of the reaction product of aniline and carbon disulfide and having the property of producing no marked acceleration of the vulcanization of rubber below 100° C. and having a softening point between 65° and 75° C.

18. The process of vulcanizing rubber comprising heating rubber with suitable vulcanizing agents in the presence of an accelerator obtained from the reaction product of aniline and carbon disulfide by destructive and fractional distillation.

19. The process of vulcanizing rubber, comprising heating rubber with suitable vulcanizing agents in the presence of an accelerator obtained from the reaction product of aniline and carbon disulfide by destructive and fractional distillation and agitation with air.

20. The process of vulcanizing rubber, comprising heating rubber with suitable vulcanizing agents in the presence of an accelerator having a softening point lying between 65° and 75° C., obtained from the reaction product of aniline and carbon disulfide by heat, agitation with air, and distillation.

NORMAN ARTHUR SHEPARD.
JUSTUS HARVEY DOERING.